United States Patent [19]
Matz

[11] 3,796,316
[45] Mar. 12, 1974

[54] WATER FILTERING APPARATUS

[76] Inventor: Alexander Matz, 41 Belmont Ave., Feeding Hills, Mass. 01030

[22] Filed: July 7, 1972

[21] Appl. No.: 269,810

[52] U.S. Cl. .............................................. 210/332
[51] Int. Cl. .......................................... B01d 35/22
[58] Field of Search...................... 210/332, 66, 152

[56] References Cited
UNITED STATES PATENTS

| | | | |
|---|---|---|---|
| 3,115,458 | 12/1963 | Bebech | 210/33 UX |
| 3,055,290 | 9/1962 | Arvanitakis | 210/332 X |
| 3,482,700 | 12/1969 | Bebech | 210/332 |

*Primary Examiner*—Frank A. Spear, Jr.
*Attorney, Agent, or Firm*—Chapin, Neal and Dempsey

[57] ABSTRACT

Water filtering apparatus having a plurality of tubular filter elements depending into a tank from a vertically movable plate supported by a mechanism for selectively raising and dropping the plate to impact against a stop means to dislodge sludge and solid waste material from the filter elements and deposit the same into an upwardly opening, collection reservoir underlying and communicating with the tank. A sludge compactor includes a cylinder with porous ram to compact the solid waste material dropped from filter elements into a dense wad or cake. The cylinder also has a porous wall portion and in the compaction of the solid waste includes a discharge trap for removal of the sludge cake.

2 Claims, 7 Drawing Figures

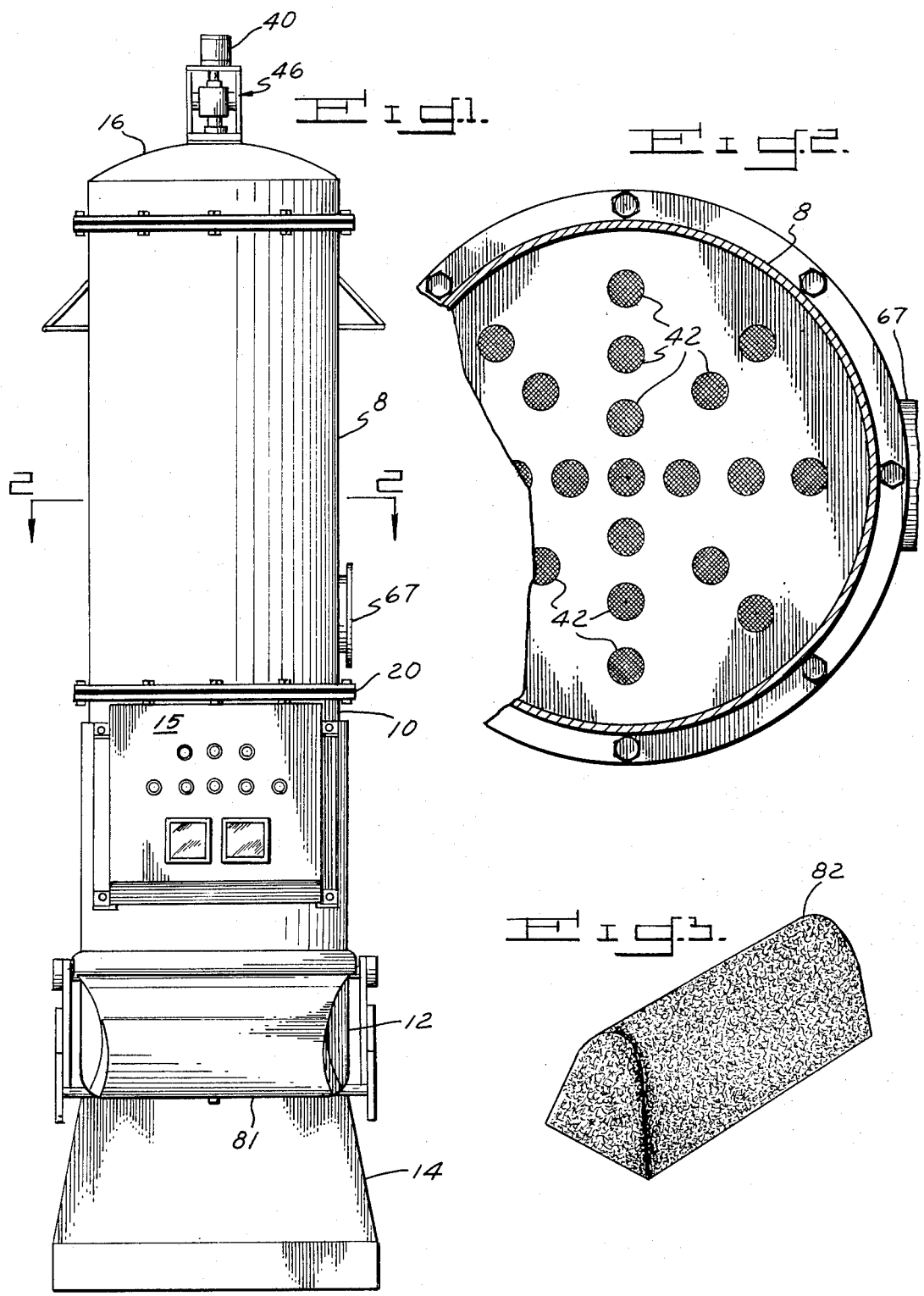

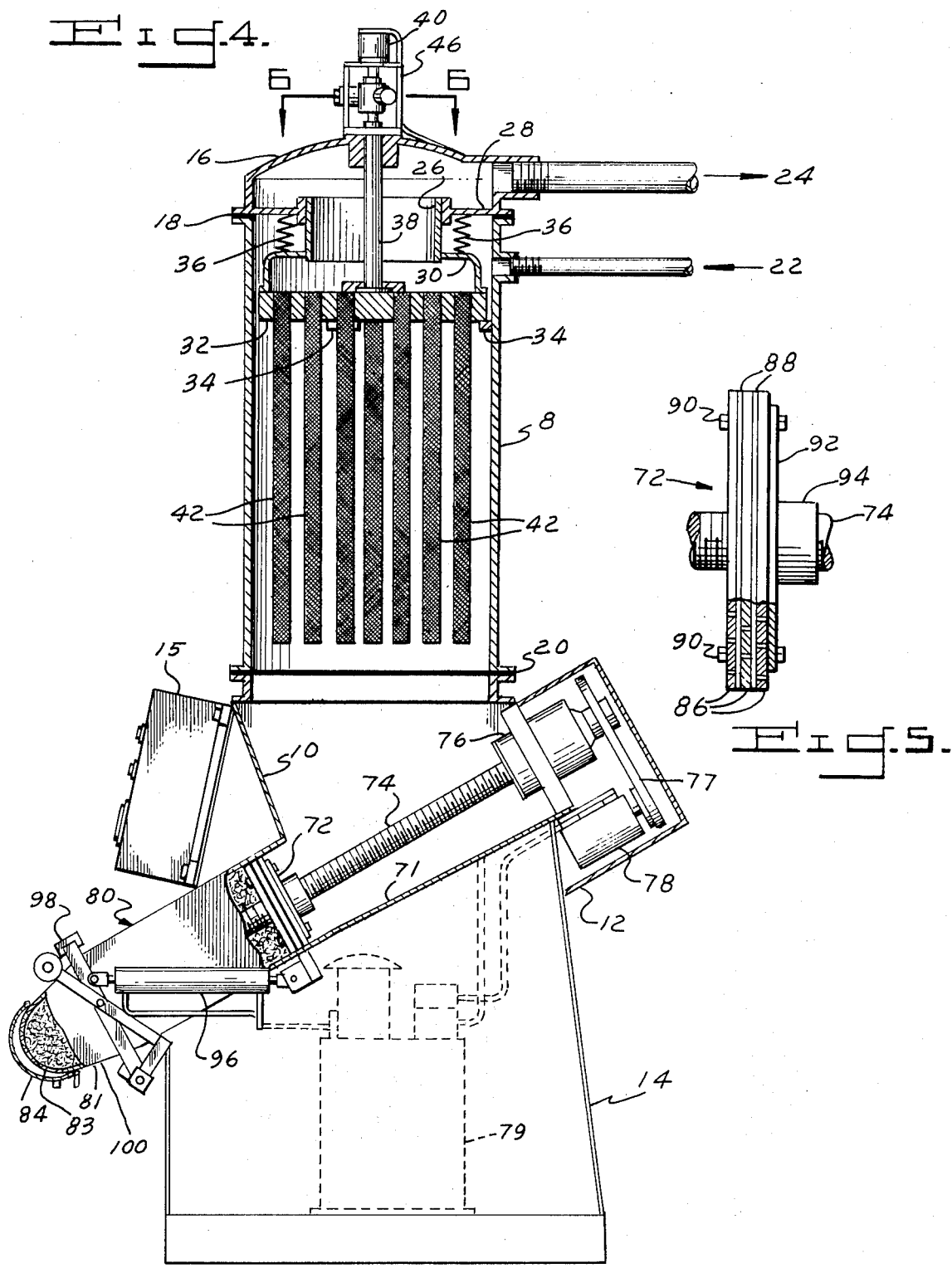

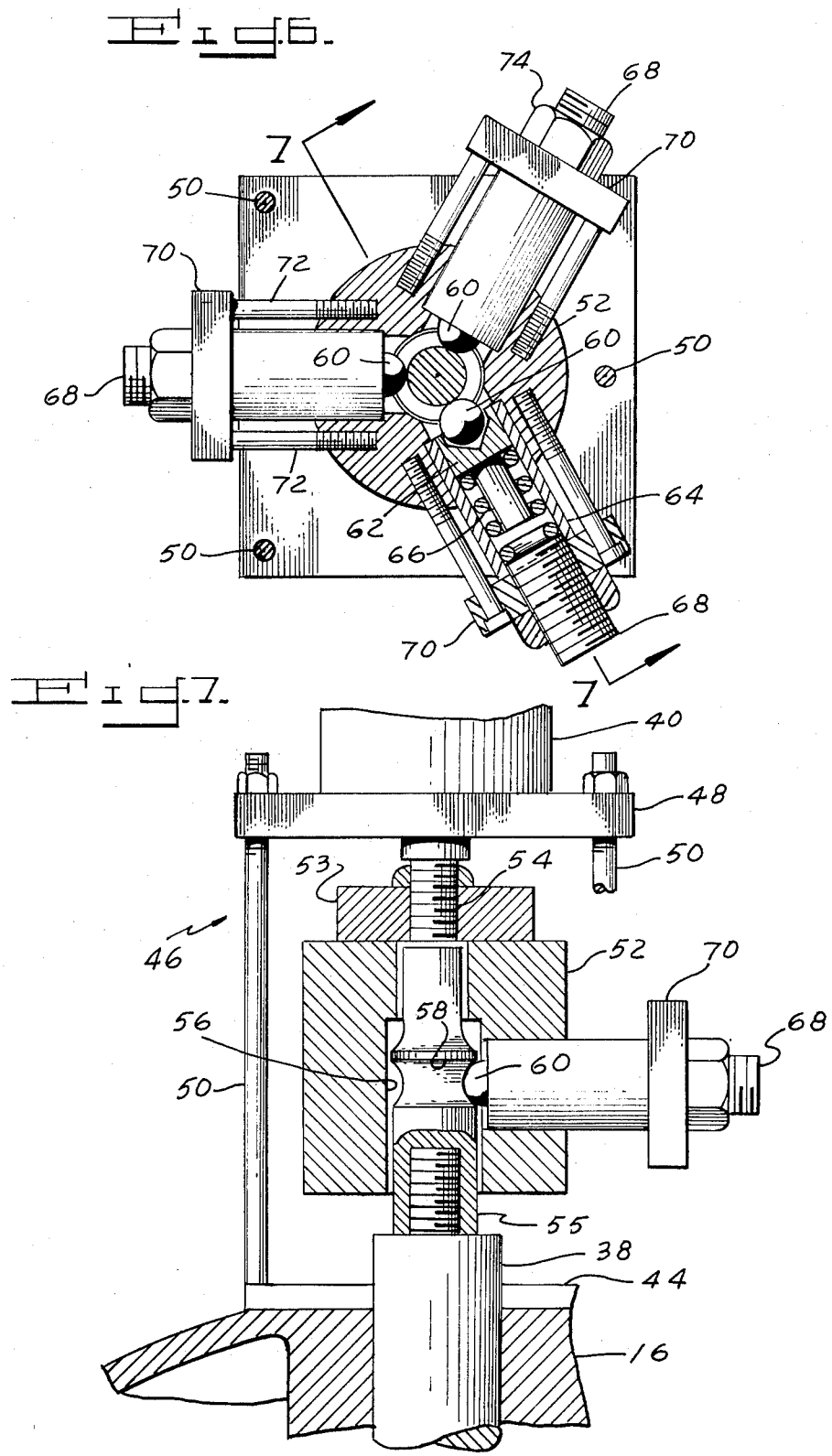

WATER FILTERING APPARATUS

The principal object of this invention is to provide a simple, yet effective apparatus for removing solid pollutants from liquids, particularly water.

A further object of this invention is to provide a solids separation system which is adapted to periodically clean itself automatically without the need of backwashing and downtime.

A further object of this invention is to provide a continuous flow, self-cleaning filtration system for liquids which, when the sludge reaches a predetermined level, the system may be operated to clean the filter elements and thereafter remove the sludge in the form of a compact solid cake which can be readily disposed of.

The above and other objects of this invention will be more readily appreciated from the following description and with reference to the accompanying drawings, in which:

FIG. 1 is an overall elevational view showing a filtration system embodying this invention;

FIG. 2 is a partial cross sectional view taken along line 2—2 of FIG. 1;

FIG. 3 is a perspective view showing the solid waste material in compacted form as it is discharged from the unit;

FIG. 4 is a cross sectional elevational view showing the system;

FIG. 5 is an enlarged view of the ram used in the system;

FIG. 6 is a view taken along section 6—6 of FIG. 4; and

FIG. 7 is a cross sectional view taken along line 7—7 of FIG. 5.

In FIG. 1 is shown an overall view of a water filtration system embodying this invention and comprising a filtration tank 8 mounted upon a solids collection reservoir 10 and a solids compaction unit 12, all supported on a base 14. A control unit 15 is associated with the filtration system and as shown is appropriately mounted to control the operation of the various phases of the filtration cycle. With reference to FIG. 4, it will be seen that the tank includes a closure dome 16 affixed to the upper end of the tank with a sealing gasket 18 provided between the mating flanges of the tank and dome. Similarly, a sealing gasket 20 is provided between the tank 8 and the solids collection reservoir 10. The tank 8 includes inlet and outlet fluid conduits 22 and 24, respectively, whereby contaminated water under pressure enters the system and after filtration in the manner to be hereinafter described, leaves through conduit 24.

Coaxially disposed within the tank 8 and adjacent its upper end is a tubular passage or conduit 26 which spans an axial length of the tank approximately the same as the distance between the inlet and outlet conduits 22 and 24. An imperforate flange 28 spans the tank from the upper edge of the conduit 26 to the tank wall at a point just below the outlet conduit 24. A bell-shaped flange 30 slidingly fits around the conduit 26 and extends outwardly and downwardly from the outer periphery of the conduit 26 to filter element support plate 32 and is affixed at its lower end to the outer periphery of the plate 32. The outer diameter of plate 32 is sufficiently less than the inner diameter of the tank 8 to accommodate water circulation under pressure from the inlet pipe 22 downwardly around the bell flange 30 and plate 32. Plate 32 is supported on a plurality of circumferentially spaced abutments 34 appropriately secured at spaced locations about the inner surface of the tank 8.

Water containing contaminants supplied under pressure throughout the conduit 22 flows downwardly into the tank 8, which opens into collection reservoir 10, and then upwardly through the plurality of closely spaced tubular screen or filter elements 42 which depend from the plate 32 and upon which eventually all waterborne solid contaminants are caught and held by the fine wire mesh of the tubular filters. The filtered water departs through the apertures provided in the plate 32 and then through the outlet conduit 26.

Means is provided to periodically clean away or dislodge sludge or particulate matter lodged on the filter tubular elements 42. In the embodiment shown, the cleaning means comprises a mechanism for selectively raising and forcefully impacting the filter element support plate to dislodge solid particles retained by the filters 42. When freed from the filter elements the particulate materials settle into the collection reservoir 10 and ultimately in the compaction cylinder 12. During this filter cleaning operation pressurized circulation of water into the tank is cut off so that the particles can settle by gravity into the compactor. Forceful impact is imparted by gravity and coil springs 36 which are provided between the opposed faces on the underside of the flange 28 and the upper surface of the bell-shaped flange 30. A lifting rod 38 is connected to the center of the plate 32 and extends upwardly through the top of the dome 16 to hydraulic piston 40 which serves to raise the plate 32, bell flange 30 carried thereon and the plurality of filter elements 42 depending from the plate.

As shown in FIGS. 6 and 7, the rod 38 extends through the center of the dome 16 and the base plate 44 of a combination coupling and dropping mechanism shown generally at 46. This mechanism comprises hydraulic cylinder 40 mounted on a plate 48 supported in spaced relation to the plate 44 at a substantial distance thereabove to accommodate the necessary length of stroke for raising of the filter support plate 32 to achieve sufficient impact for a thorough cleaning action. The cylinder support plate 48 is supported by a plurality of upstanding studs or rods 50. A block 52, affixed to a plate 53 is threaded onto the lower end of the piston rod 54 which is reciprocated upwardly and downwardly by the hydraulic piston 40 in response to programmed actuation by control panel 15. The block 52 is provided with a downwardly opening bore 56 into which extends the upper end of the rod 38. In the embodiment shown rod 38 is provided with a coupling tip 55 having a circumferential groove 58. Means for releasably coupling the piston rod 54 to the rod 38 is provided in a form of a plurality of ball or roller elements 60 spring loaded into surface-to-surface engagement with an annular groove 58 formed about coupling 55. Each of the balls 60 is held in a retainer block suitably recessed to accommodate and hold the balls therein. Each ball retainer 62 is slidably fitted into a tubular housing or cylinder 64 in which is disposed a coil spring 66 seated at its inner end against the undersurface of the retainer 62 and at its outer end against the inner end of an adjustable tensioning screw 68. The tensioning screw extends through a plate 70 which is in turn supported by studs or bolts 72 extending radially outward of the block 52 at circumferentially spaced locations thereabout. Lock nuts 74 are employed to lock the adjusting screws at predetermined positions of spring tension whereby the lifting rod 38 will be dropped after it has been raised to a given height.

As the hydraulic cylinder 40 is operated in the upstroke of its cycle, the piston rod is raised, lifting the block 52 and the rod 38 releasably coupled thereto by the spring ball couplers 60. This in turn raises the filter screen support plate 32 together with the bell-shaped flange 30. During the upstroke, the coil springs 36 are compressed between the flanges 28 and 30 until the weight of this assembly and the force of coil springs 36 overcomes the tension of springs 66 which urge the balls 60 into engagement with the coupling groove 58. At this point the rod 38 is released and gravity and the force of spring 36 cause the plate to forcibly impact against support abutments 34 whereby accumulated solid material picked up by the screen elements 42 is dislodged and drops into the collection tank 10. The appropriate dropping height can readily be selected by adjusting the tension of springs 66 to increase or decrease the frictional gripping force of the balls 30 in the groove 58. The greater the tension set on springs 66 the higher the filter plate will be raised before it is released and the more forcible will be its impact. The tank (FIG. 1) may be provided with an inspection port 67 through which periodic visual inspections can be made of the interior of the tank.

Solid matter dislodged from the filter screens 42 settles onto the bottom or floor 71 of the compaction cylinder 12. The compaction cylinder includes a ram 72 reciprocably driven by a screw drive shaft 74 rotated by a belt-driven, drive unit 76, in turn driven by an hydraulic motor 78. The hydraulic components of the system are powered by hydraulic pump 79 located in the base 14. As the solid particles settle onto the inclined floor 71 of the compaction cylinder they gravitate downwardly toward the cylindrical end 80 of the compactor which is provided with a hinged discharge gate or trap 81. The cylinder 80 opens upwardly and is dimensioned to receive in close sliding relationship the ram 72 which is operated periodically to move the solid particulate material into the cylinder 80 and compact the same into a dense wad or "cake" 82 (FIG. 3). The outer end wall of the compactor is of generally double wall construction with the inner wall 83 thereof being characterized by its fine porosity, so that liquid trapped between the porous ram and end wall 83 will escape through these porous members enabling maximum compaction of the solid waste material. The outer end wall 84 serves to collect the moisture which penetrates wall 83 and is provided with a suitable drain to funnel the water to a suitable discharge line or tank.

In the embodiment shown, the ram 72 comprises perforated metallic plates 86 with fine mesh screens 88 clamped therebetween. This assembly is bolted together, as at 90, onto plate 92 which extends outwardly of a hub 94 internally threaded to mesh with the threaded drive shaft 74. Rotation of the drive shaft in opposite directions selectively moves the ram downwardly or outwardly for compaction and retraction cycles.

Prior to a filter cleaning cycle, the ram 72 is retracted to its rearward position adjacent its drive mechanism 76. After the tubular filters 42 are "bumped" clean, in one or more cycles, as required, the hydraulic motor 78 is operated to move the ram downwardly whereby the solid particulate matter which has collected on floor 71 is moved into the cylindrical end 80 of the compaction unit. Continued operation of the drive motor 78 compacts and densifies the solid material into wad 82. Thereafter, hydraulic cylinder 96 is actuated to operate a toggle mechanism 98 to open the discharge trap 81 hinged to the outer end of the cylindrical portion 80 of the compactor. Upon opening of the bucket, the wad or cake 82 discharges from the system into any suitable receptacle, such as reclaiming boxes or onto a conveyor belt, not shown.

Having thus described my invention, what is claimed is:

1. Apparatus for filtering from water particulate materials comprising a water circulation tank, a vertically movable plate having a plurality of holes therethrough, a tubular filter screen depending from said plate at each aperture, spring means disposed to exert a downward force on said support plate when it is raised, means for raising and dropping said plate to dislodge by impact particulate matter trapped on said tubular screens, an hydraulic piston to raise the filter support plate, a shaft extending upwardly from said plate with its upper end terminating in spaced relation to a rod extending downwardly from said piston, coupling means for releasably interconnecting said shaft to said piston rod and being adapted to release said shaft when said spring means exerts a downward force on said plate of predetermined magnitude, said apparatus further comprising a compaction reservoir opening towards said tank to receive the particulate materials dislodged from said filter elements and a porous ram operable to compact said materials into a dense wad.

2. Apparatus as set forth in claim 1 in which said coupling means comprise spring tensioned roller elements carried by a connector affixed to said piston rod, said elements being releasably engaged with an annular recess formed in said shaft to hold said piston rod and shaft in coupled end-to-end, the holding force exerted by said spring tensioned rollers being less than the downward force exerted by said spring means when the movable plate is raised to a given height.

* * * * *